United States Patent [19]
Beck

[11] Patent Number: 5,927,828
[45] Date of Patent: Jul. 27, 1999

[54] HYDRAULIC BRAKE SYSTEM WITH BRAKE SLIP CONTROL AND AUTOMATIC BRAKE MANAGEMENT

[75] Inventor: Erhard Beck, Weilburg, Germany

[73] Assignee: ITT Manufacturing Enterprises Inc., Wilmington, Del.

[21] Appl. No.: 08/875,538

[22] PCT Filed: Jan. 31, 1996

[86] PCT No.: PCT/EP96/00379

§ 371 Date: Oct. 21, 1997

§ 102(e) Date: Oct. 21, 1997

[87] PCT Pub. No.: WO96/23681

PCT Pub. Date: Aug. 8, 1996

[30] Foreign Application Priority Data

Feb. 1, 1995 [DE] Germany .......................... 195 03 074

[51] Int. Cl.[6] .................................................. B60T 8/40
[52] U.S. Cl. .................... 303/116.2; 303/113.2; 303/DIG. 11
[58] Field of Search ............................. 303/116.1, 116.2, 303/113.2, DIG. 11

[56] References Cited

U.S. PATENT DOCUMENTS

| | | | |
|---|---|---|---|
| 5,152,586 | 10/1992 | Burgdorf | 303/DIG. 11 X |
| 5,290,098 | 3/1994 | Burgdorf et al. | 303/116.2 X |
| 5,411,326 | 5/1995 | Linhoff | 303/116.2 |

Primary Examiner—Peter M. Poon
Attorney, Agent, or Firm—Rader, Fishman & Grauer PLLC

[57] ABSTRACT

The present invention relates to a hydraulic automotive vehicle brake system with brake slip control and automatic brake management for traction control and driving dynamics control including a braking pressure generator which is hydraulically connectable with at least one wheel brake and a pressure fluid accumulator by way of pressure modulation valves, a pump which is connected with its suction side to the pressure fluid accumulator and with its pressure side to a pressure fluid conduit which extends from the braking pressure generator to the wheel brake and accommodates the pressure modulation valves. The pressure fluid accumulator is partially charged, to which end a pressure fluid connection between the pressure fluid accumulator and the suction side of the pump can be closed. Upon attainment of the maximum partial charge, excessive pressure fluid volume can be withdrawn from the pressure fluid accumulator, and the capacity of the pressure fluid accumulator is not exhausted.

8 Claims, 5 Drawing Sheets

HYDRAULIC BRAKE SYSTEM WITH BRAKE SLIP CONTROL AND AUTOMATIC BRAKE MANAGEMENT

BACKGROUND OF THE INVENTION

The present invention relates to a hydraulic automotive vehicle brake system with brake slip control and automatic brake management for example for traction control or driving dynamics control.

German patent No. 42 32 311 discloses a hydraulic automotive vehicle brake system with an anti-lock device which, for improvement of the vehicle tracking behavior, includes automatic brake management for driving dynamics control. Special arrangements are required both for driving dynamics control and for traction slip control to provide sufficiently quickly the pressure fluid necessary for brake management by way of a pump. The brake system disclosed in the prior art document includes a separate auxiliary pressure supply means upstream of, i.e. on the suction side of, the pump circuit of the brake system. The auxiliary pressure supply means is an auxiliary pressure pump with a precharging piston for supplying and making available a sufficient amount of pressure fluid for each pump circuit, and a plurality of valves. This arrangement involves relatively extensive effort and structure.

SUMMARY OF THE INVENTION

Therefore, an object of the present invention is to provide a hydraulic automotive vehicle brake system with brake slip control and automatic brake management so that a quick response of the pump, responsible for the supply of the wheel brakes, is achieved with relatively little expenditure by the provision of an unrestricted, sufficient amount of pressure fluid.

According to the present invention, this object is achieved in that the pressure fluid accumulator is partly charged for automatic brake management. This requires a possibility of closing the pressure fluid connection between the pressure fluid accumulator and the suction side of the pump. To terminate the partial charging operation, excessive pressure fluid volume can be withdrawn from the pressure fluid accumulator. This arrangement prevents premature exhaustion of the capacity of the pressure fluid accumulator.

Further details of the present invention are described in the following by way of several embodiments.

DETAILED DESCRIPTION OF THE DRAWINGS

Figure 1:
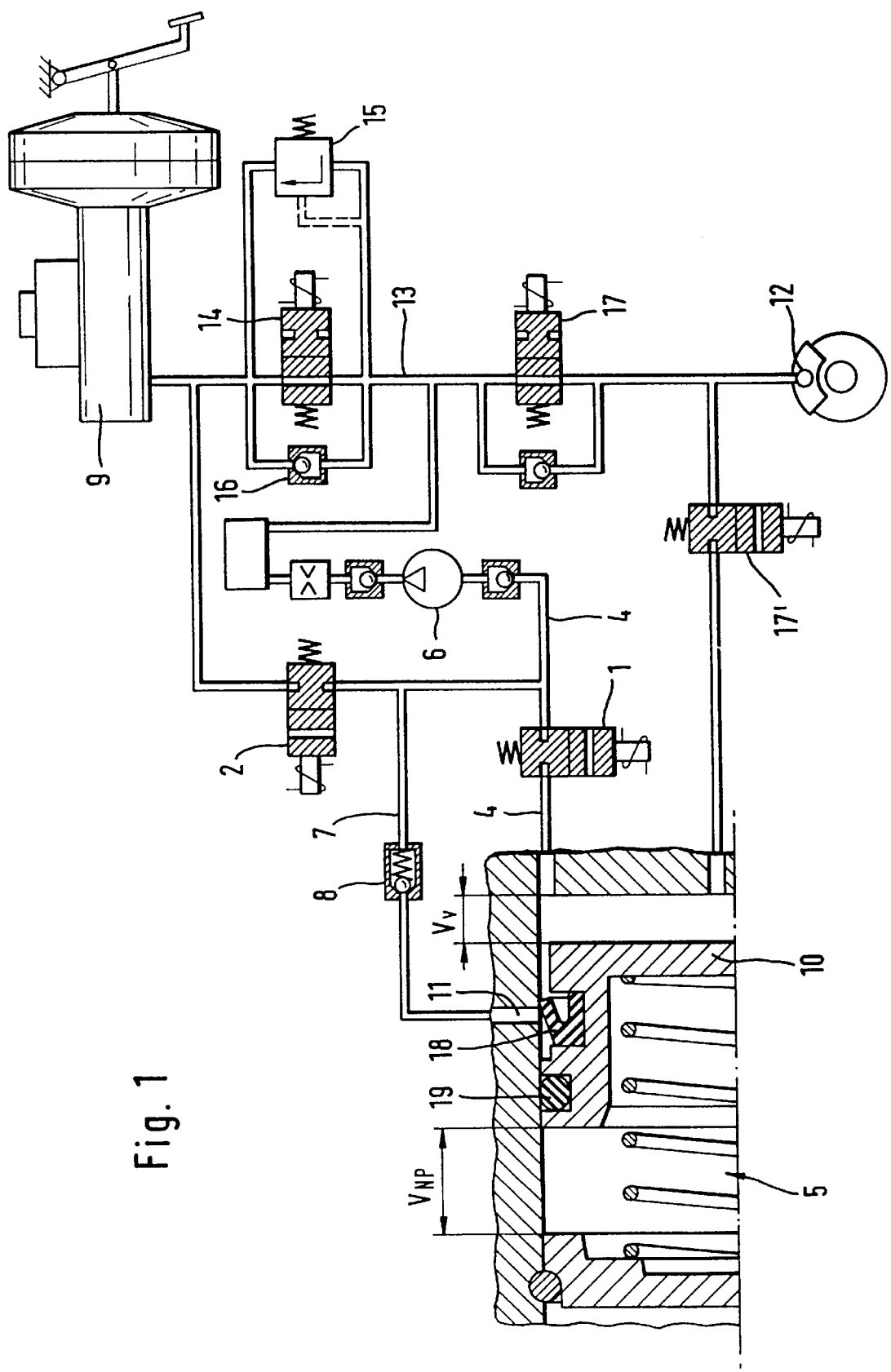
FIG. 1 is a view of the principle circuit scheme and construction of a first embodiment of the present invention.

FIG. 1 shows the principal circuitry design for the operation of a wheel brake 12 which is appropriate for traction control and driving dynamics control by way of brake slip control and automatic brake management. A main pressure line 13 leading to the wheel brake 12 is connected to the braking pressure generator 9. Arranged in line 13 is an electromagnetically operable separating valve 14, in parallel thereto a pressure-limiting valve 15 and a non-return valve 16 closing in the direction of the braking pressure generator. Further, pressure modulation valves 17, 17' are interposed between the separating valve 14 and the wheel brake 12. The pressure modulation valve 17 is an inlet valve which is open in its electromagnetically deenergized, initial position. Pressure modulation valve 17', in its initial position, electromagnetically closes the pressure fluid connection between the wheel brake 12 and a pressure fluid accumulator 5. The pressure fluid accumulator 5 generally includes a charging piston 10 which, for being sealed in the housing, has a sleeve seal 18 and an annular seal 19 at its periphery. In the illustration shown, the charging piston 10 adopts a position which corresponds to a partial charge of the pressure fluid accumulator 5. A piecharging volume Vv required for the pump 6 is produced during the partial charging operation. The precharging volume Vv can be conducted to the pump 6 by way of the pressure fluid connection 4 extending from the pump 6 on the suction side, by the action of the biasing force on the charging piston 10. A multi-way valve 1 which is electromagnetically closed in its initial position is arranged in the pressure fluid connection 4 to conduct the precharging volume Vv in the direction of the pump 6. Initially, the multi-way valve prevents premature emptying of the pressure fluid accumulator and switches to adopt its open position exclusively during automatic brake management for traction control or driving dynamics control. Another pressure fluid channel 7, which takes up pressure fluid of the pressure fluid accumulator 5 that is in excess of the precharging volume Vv, opens into the pressure fluid connection 4 between the multi-way valve 1 and the pump 6. A non-return valve 8 in the function of a pilot valve closes the pressure fluid channel 7 in the direction of the pressure fluid accumulator 5. At the point where the pressure fluid channel 7 opens into the pressure fluid connection 4, a pressure fluid connection to the braking pressure generator 9 is connected, wherein a multi-way valve 2, which is not energized electromagnetically in its initial position, separates both the suction side of the pump 6 and the pressure fluid channel 7 from the braking pressure generator 9. All above-mentioned multi-way valves 1,2 are two-way/two-position directional control valves.

The operation of the brake system of the present invention will be explained in detail in the following. To ensure that pump pressure is quickly provided for automatic brake management, preferably, pressure fluid is taken by the pump 6 from the supply reservoir of the braking pressure generator 9 for a defined period in a pump test run. The pressure fluid is conducted to the pressure fluid accumulator 5 by way of the open pressure modulation valves 17, 17'. The multi-way valve 1 remains in its closed position, as shown in the drawing, so that the pressure fluid supplied by the pump 6 moves the charging piston 10 into a position which corresponds to the partial charge and, thus, to the necessary precharging volume Vv of the pump 6 for quick response of the wheel brake 12. The charging piston 10 with its sleeve seal 18 assumes a breathering position which, more or less, causes return flow of excessive pressure fluid into the pressure fluid channel 7. Thus, excessive pressure fluid is conducted in the direction of the suction side of the pump 6. When the pump test run is completed, a precharging volume Vv for the pump 6 will be available in the pressure fluid accumulator 5. Upon the commencement of automatic brake management for traction control or driving dynamics control, the precharging volume, due to pump 6, causes a quick pressure increase in the wheel brake 12 by way of the open multi-way valve 1. For brake slip control, however, the multi-way valve 1 remains closed so that the pump is initially supplied with a sufficient amount of pressure fluid by way of the open multi-way valve 2, assisted by the actuation of the braking pressure generator 9 proportional to pedal force. The pressure fluid volume which flows into the pressure fluid accumulator 5 during a braking pressure reduction period by way of the open pressure modulation valve 17' displaces the charging piston 10 beyond the illustrated partial charge position until piston 10 is almost in its maximum position. When required, pressure accumulator 5 provides pressure fluid from its intermediate storage reservoir sufficiently quickly to the pump 6, with multi-way valve 1 open and multi-way valve 2 closed.

Figure 2:
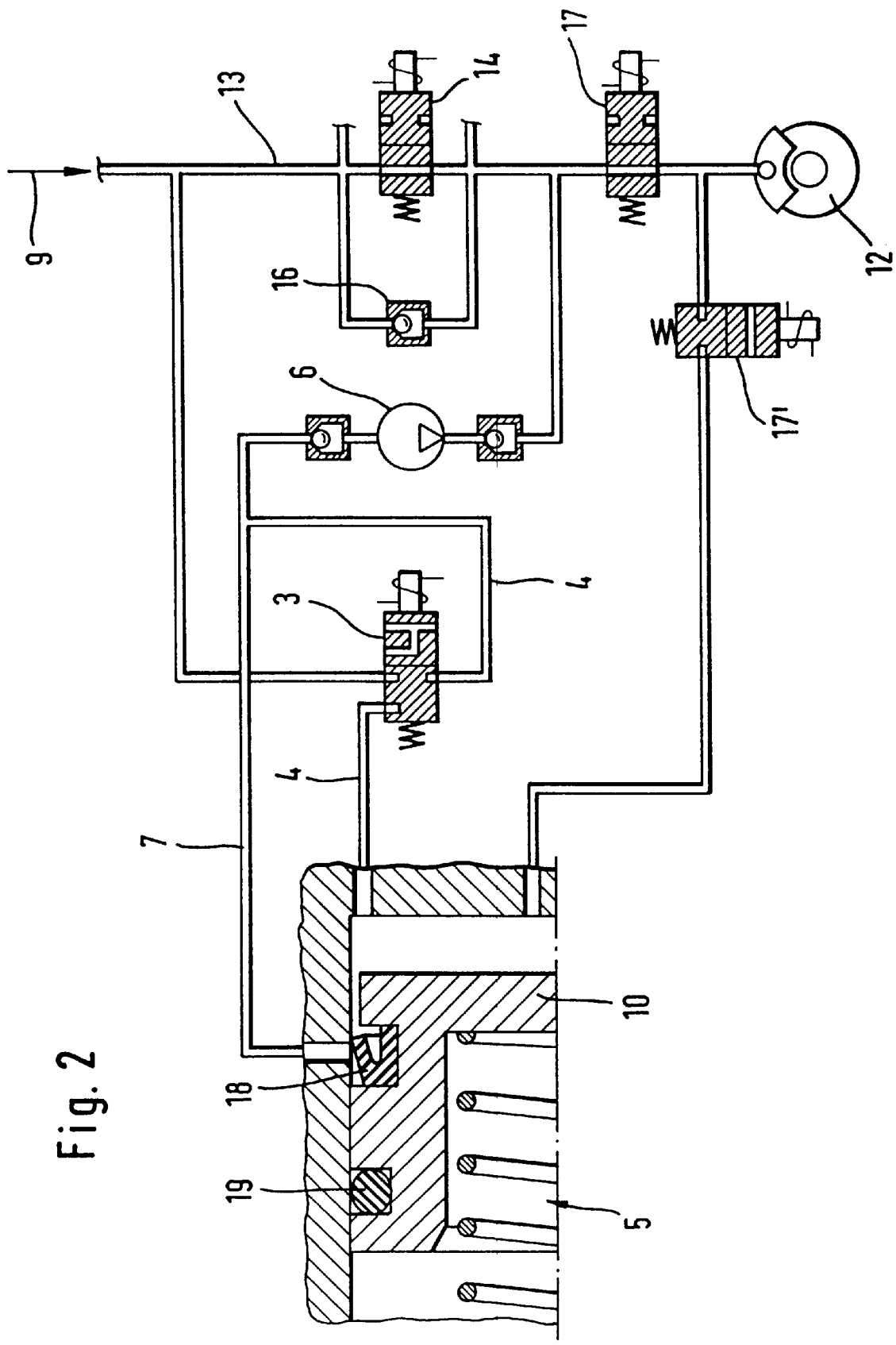
FIG. 2 is an alternative design of the valve assembly shown in FIG. 1.

Different from FIG. 1, FIG. 2 shows a combined switching arrangement of the multi-way valves 1 and 2 known from FIG. 1 so that in FIG. 2 a multi-way valve 3 configured as a three-way/two-position directional control valve is used, without the need to modify the basic circuit arrangement of FIG. 1. Therefore, repeated illustration of all details of FIG. 2 is not required, reference being made to FIG. 1. The operation of the multi-way valve 3 will be explained briefly hereinbelow. The pressure fluid connection 7 leading to the suction side of the pump 6 is closed in the illustrated basic position of the multi-way valve 3. The same applies to the pressure fluid connection between the braking pressure generator 9 and the suction side of the pump 6. In the illustrated switching position of the multi-way valve 3, pressure fluid supply from the pressure fluid accumulator 5 to the suction side of the pump 6 by way of the pressure fluid channel 7 is effected exclusively when the charging piston 10 adopts a position which exceeds the partial charging of the pressure fluid accumulator 5. As mentioned in FIG. 1, during brake slip control operations, the piston 10 is displaced in the direction of maximum output (maximum charge) as soon as pressure fluid of the wheel brake 12 is conducted to the pressure fluid accumulator 5 by way of the electromagnetically opened pressure modulation valve 17' in a pressure reduction period. To effect brake management for traction control or driving dynamics control, the multi-way valve 3 is electromagnetically energized to adopt a position where both the precharging volume Vv, by way of the pressure fluid connection 4, and the pressure fluid connection between the braking pressure generator 9 and the suction side of the pump is released. The precharging volume Vv will then move in the direction of the suction side of the pump 6 due to the long pressure fluid connection to the braking pressure generator 9 which includes resistors. Thus, a pressure dynamics desirable for the quick pressure build-up in the wheel brake 12 is ensured by the precharging effect of the pressure fluid accumulator.

Figure 3:
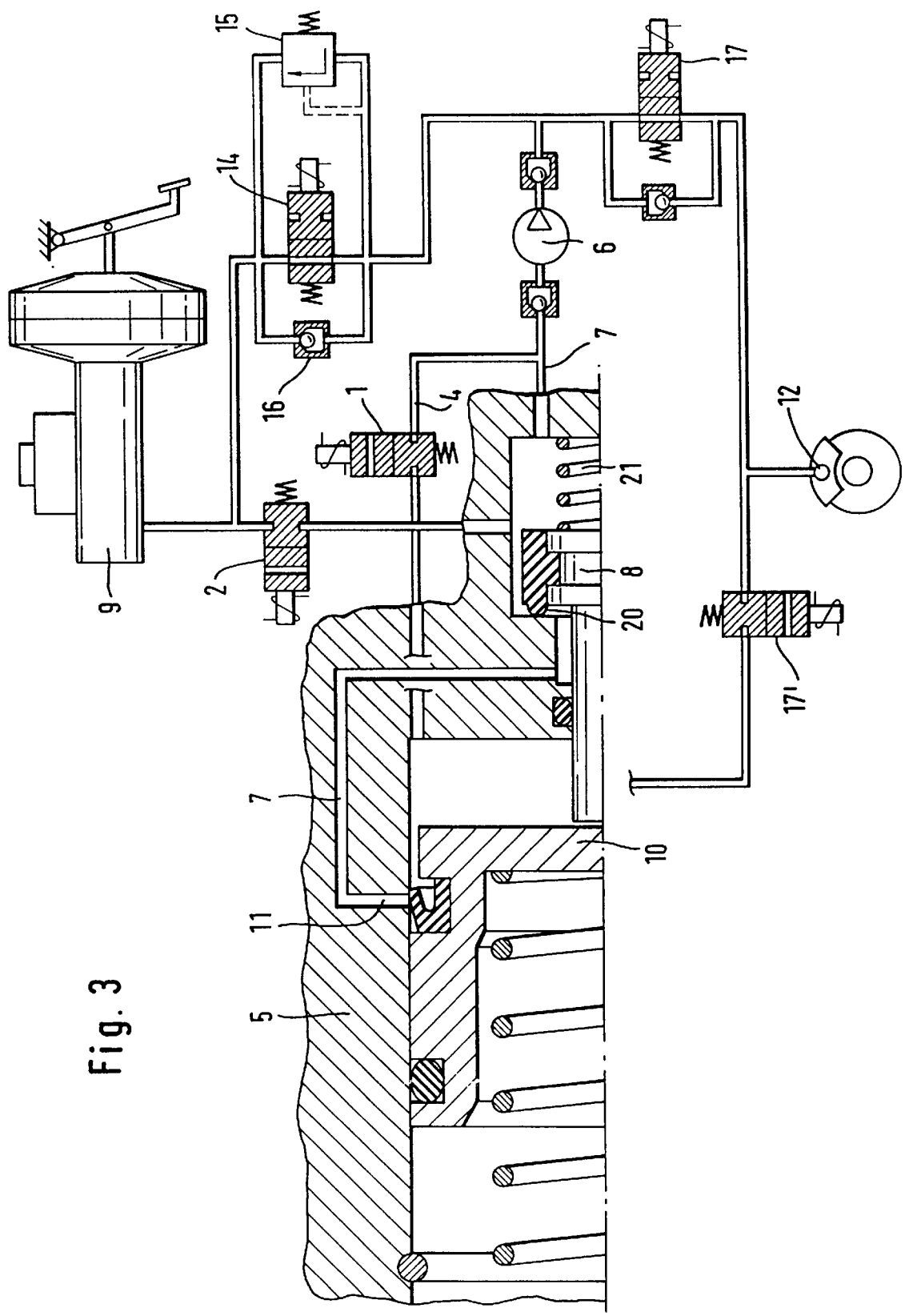
FIG. 3 is a favorable design of the non-return valve disclosed in FIGS. 1 and 2, along with further features relevant to the present invention.

FIG. 3 shows a construction of the non-return valve 8 principally disclosed in FIGS. 1 and 2 in conjunction with the charging piston 10 of the pressure fluid accumulator 5. To this end, the frontal end of the accumulator housing opposite the charging piston 10 includes a through-opening in which the piston stem of the non-return valve 8, functioning as a pilot valve, is guided and sealed. Succeeding the piston stem is an enlarged piston cross-section having a sealing surface which is pressed in the direction of a housing step by the action of a compression spring 21. When the non-return valve 8 adopts the switch position shown in the drawing, it closes the pressure fluid channel 7 due to the precharging position of the charging piston 10 and also when the partial charge position is exceeded in the direction of full charging. The pressure fluid channel 7 is closed or opened due to the stroke of the charging piston 10. In FIG. 3, the pressure fluid channel 7 opens between the seat of the non-return valve 8 and the annular chamber of the pressure fluid accumulator 5 which accommodates the non-return valve 8. At the beginning of automatic brake management for traction control or driving dynamics control, the non-return valve 8 is contacted by the charging piston 10 as soon as the precharging volume Vv stored in the pressure fluid accumulator 5 is conducted to the suction side of the pump 6 by way of the multi-way valve 1. Valve 1 is switched electromagnetically into its open position. When the spring preloading force on the non-return valve 8 is exceeded, the non-return valve 8, in opposition to its resilient effect, will open the pressure fluid channel 7 to the suction side of the pump 6. When the precharging volume Vv is exhausted and the pressure-fluid accumulator 5 is bypassed, pressure fluid is conducted from the braking pressure generator 9 to the suction side of the pump 6 by way of the second multi-way valve 2 connected to the braking pressure generator 9. Valve 2 is also switched electromagnetically to its open position during automatic brake management. For the partial charging operation and, thus, for restoring the precharging volume Vv in the pressure fluid accumulator 5, the multi-way valve 1 in the pressure fluid connection 4 is closed again so that the pump 6 can aspirate fluid from the braking pressure generator 9 by way of the open multi-way valve 2. This precharges the pressure fluid accumulator 5 by way of the opened pressure modulation valves 17, 17' until the breathering position of the charging piston 10 at the pressure fluid channel 7 is reached. Exactly as in the previous embodiments of FIGS. 1 and 2, the non-return valve 8 prevents the propagation of pressure fluid from the pressure fluid accumulator 5, which is charged during anti-lock control, to the suction side of the pump as long as the electromagnetically energized multi-way valve 2 is open. In an anti-lock control operation, the pump 6 is supplied with pressure fluid by way of the pressure fluid connection connected between the separating valve 14 and the braking pressure generator 9. The pilot pressure at the pressure fluid accumulator 5 ensures a filling ratio of the pressure fluid accumulator 5 which is required to effect automatic brake management for traction slip control or driving dynamics control. The details of the brake circuit arrangement, which are not explained closely with respect to FIG. 3, correspond to those in FIG. 1.

Figure 4:
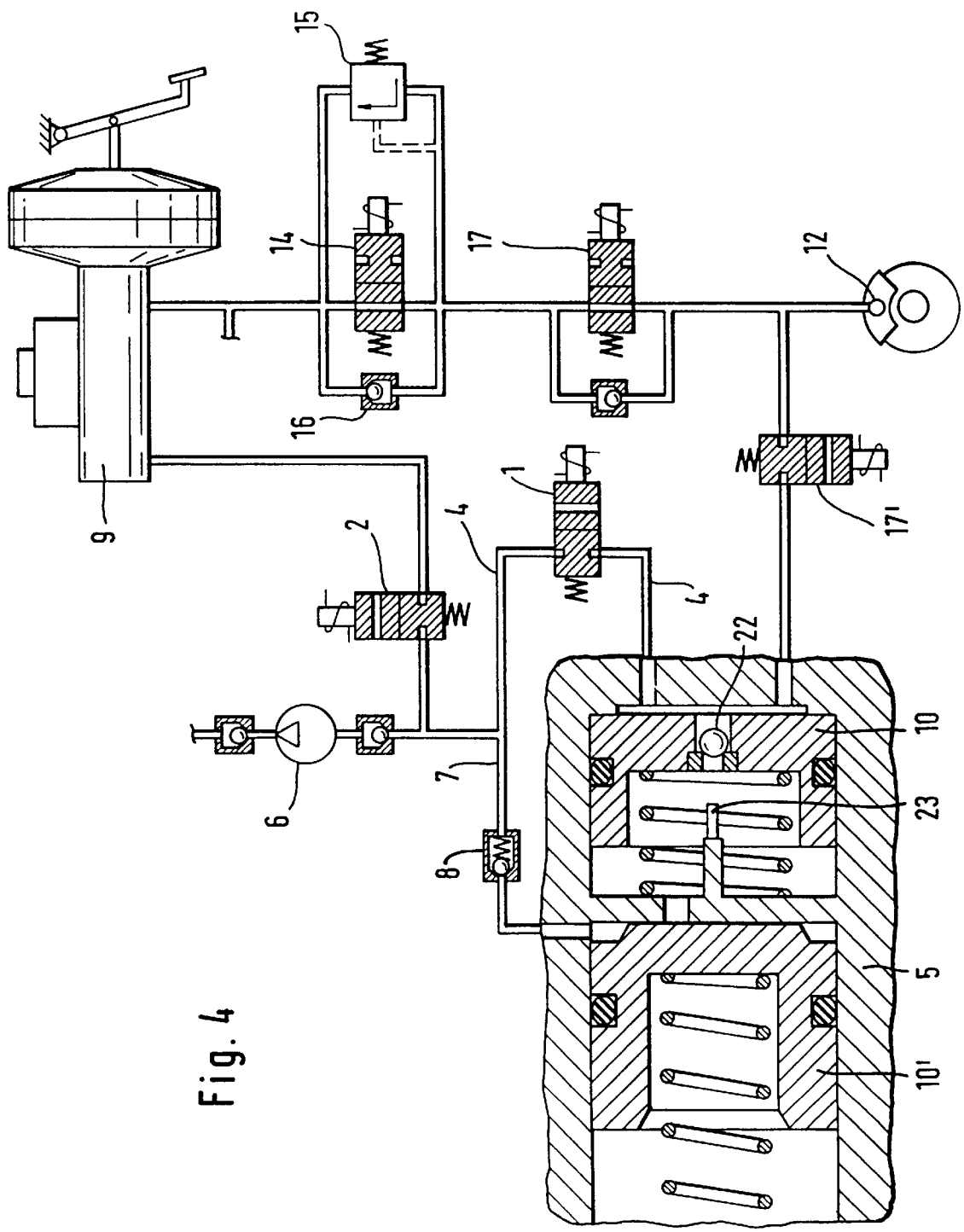
FIG. 4 is a view of an embodiment of a pressure fluid accumulator including the necessary circuit arrangement.

FIG. 4, with its circuit arrangement identical to that of FIG. 1, discloses a construction of the pressure fluid accumulator 5 including two charging pistons 10, 10' in tandem arrangement. The charging piston 10 provides the precharging volume to satisfy the pressure fluid demand of the pump 6 during automatic brake management in traction slip or driving dynamics control operations. The charging piston 10', inserted after piston 10, takes up the pressure fluid volume discharged from the wheel brake 12 after the partial charge position of the charging piston 10, which is decisive for the prefilling volume, has been exceeded. To this end, the charging piston 10 has a poppet valve 22 which is opened by a tappet 23 fixed to the housing when the partial charge position is reached. The charging piston 10', inserted after piston 10, is also acted upon by the pressure fluid volume of the wheel brake 12. Connected in the fluid-receiving chamber of the charging piston 10' is the pressure fluid channel 7 including the non-return valve 8 so that the pump 6 is not supplied with pressure fluid from return valve 8 falls short of. During anti-lock control operations, the fluid pressurized in the braking pressure generator 9 proportionally to pedal force is conducted to the suction side of the pump 6 by way of the open multi-way valve 2. In traction slip or driving dynamics control operations, however, the precharging volume, by the action of the charging piston 10, is conducted to the pump suction side by way of the pressure fluid connection 4 that is opened by the multi-way valve 1. In contrast to the previous embodiments of FIGS. 1 to 3, the charging piston 10', as a function of the selected pilot pressure of the non-return valve 8, does not move to a breathering position because the adjustment of the precharging volume and the charging of the pressure fluid accumulator, effective during anti-lock control, is carried out by separate charging pistons 10, 10' to be actuated one after the other.

Figure 5:
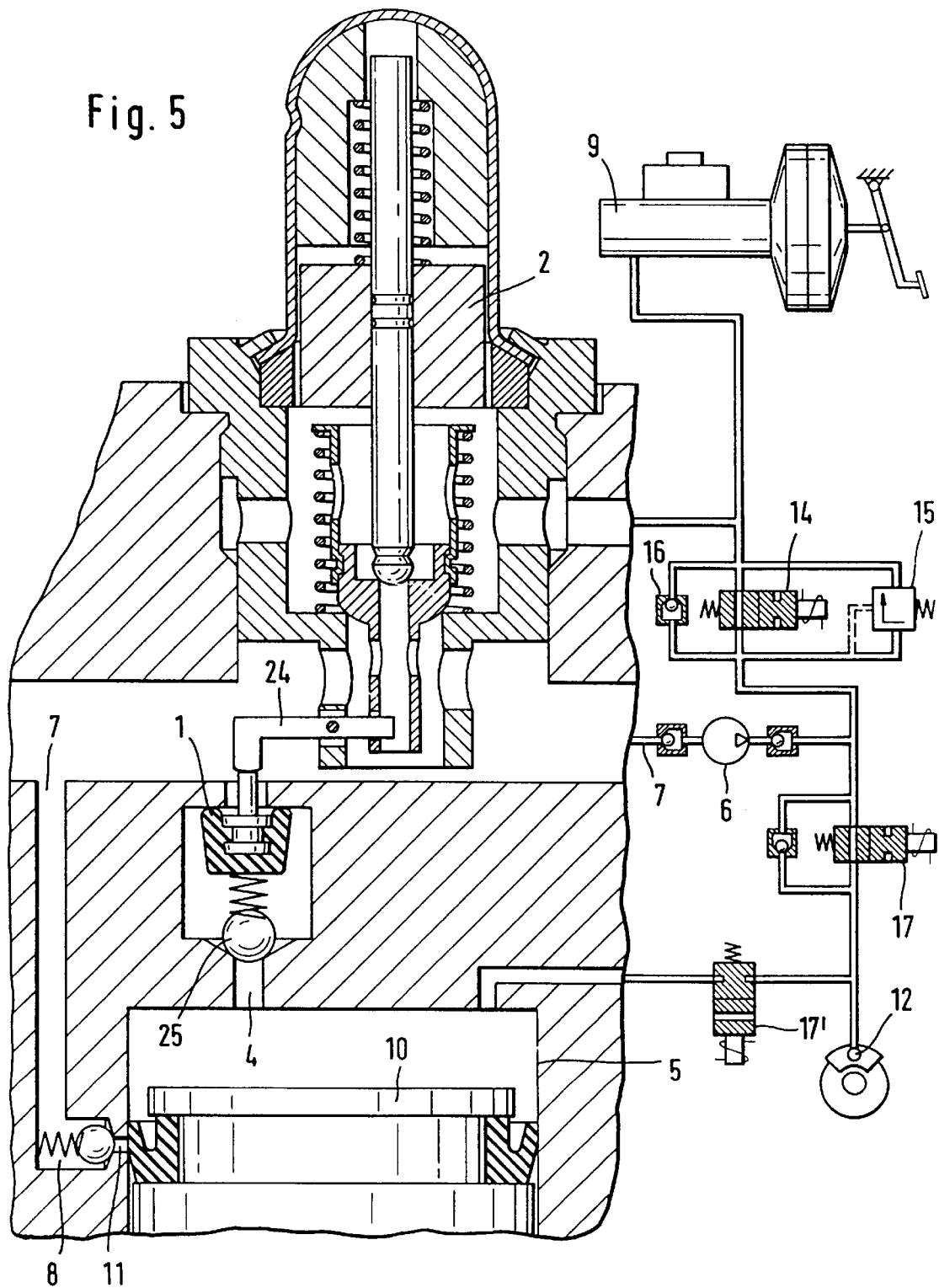
FIG. 5 is a view of functional and constructive features for the operation of the multi-way valves in conjunction with the complete circuitry design.

FIG. 5 shows another embodiment of the present invention which discloses details of the design of the multi-way valve 2 and the multi-way valve 1. When the multi-way valve 2 is electromagnetically actuated, the multi-way valve 1 is mechanically opened by a lever 24 actuating the multi-way valve 1. Lever 24 is pivoted in the housing of the multi-way valve 2. In the electromagnetically operated, open position of the multi-way valve 2, there is an open pressure fluid connection between the braking pressure generator 9 and the suction side of the pump 6. Also, the lever actuation of the multi-way valve 1 provides a hydraulic connection to the prefilling chamber of the pressure fluid accumulator 10 as long as the pressure in the prefilling chamber of the pressure fluid accumulator 10 is in excess of the pressure of a spherical non-return valve 25 interposed between the multi-way valve 1 and the pressure fluid accumulator port. Similar to the previous embodiments, a non-return valve 8 provides the pilot pressure required in the pressure fluid accumulator 5 so that pressure fluid can escape in the direction of the pump 6 by way of the non-return valve 8 only when the pilot pressure falls short of. All above-mentioned functional elements as well as the other valves necessary for pressure control are incorporated in one joint housing, with the result of a compact-size brake system. With the exception of the mechanical actuation of the multi-way valve 1 by the multi-way valve 2, the operation of the brake system of FIG. 5 corresponds to the details of the circuitry described with respect to FIGS. 1 to 4.

It is important for the present invention that a charging volume of the pressure fluid accumulator, which is in conformity to demand, is available for a quick braking pressure build-up effected by the pump.

Thus, the local charging volume in the pressure fluid accumulator can be supplied by the pump during start up with the full volumetric efficiency.

What is claimed is:

1. A hydraulic automotive vehicle brake system with brake slip control and automatic brake management,
    including a braking pressure generator which is hydraulically connectable with at least one wheel brake and with a pressure fluid accumulator,
    and including a pump which is connected with its suction side to the pressure fluid accumulator by means of a pressure fluid connection and with its pressure side to a pressure fluid conduit that extends from the braking pressure generator to the wheel brake,
    wherein partial charging of the pressure fluid accumulator is provided, to which end the pressure fluid connection between the pressure fluid accumulator and the suction side of the pump can be closed and, upon attainment of a maximum partial charge, excessive pressure fluid volume can be withdrawn from the pressure fluid accumulator by means of a charging piston inside the pressure fluid accumulator which opens a breathering bore extending to a pressure fluid channel which opens into the pressure fluid connection between the pressure fluid accumulator and the suction side of the pump and takes up pressure fluid.

2. The hydraulic automotive vehicle brake system as claimed in claim 1, wherein a multi-way valve is arranged in the pressure fluid connection between the pressure fluid accumulator and the suction side of the pump.

3. The hydraulic automotive vehicle brake system as claimed in claim 2, wherein the pressure fluid channel opens into the pressure fluid connection between the multi-way valve and the suction side of the pump.

4. The hydraulic automotive vehicle brake system as claimed in claim 2, wherein the braking pressure generator is connectable to the pressure fluid channel connected to the pressure fluid accumulator by way of another multi-way valve.

5. The hydraulic automotive vehicle brake system as claimed in claim 4, wherein the multi-way valve interposed between the pressure fluid channel and the braking pressure generator is electromagnetically operable, and the multi-way valve inserted into the pressure fluid connection is mechanically operable by the electro-magnetically operable multi-way valve.

6. The hydraulic automotive vehicle brake system as claimed in claim 1, wherein a non-return valve which closes in the direction of the pressure fluid accumulator is arranged in the pressure fluid channel to adjust a pilot pressure of the charging volume in the pressure fluid accumulator that characterizes a partial charge condition.

7. The hydraulic automotive vehicle brake system as claimed in claim 1, wherein the pressure fluid channel is closable stroke-responsively by the charging piston of the pressure fluid accumulator.

8. A hydraulic automotive vehicle brake system with brake slip control and automatic brake management,
    including a braking pressure generator which is hydraulically connectable with at least one wheel brake and with a pressure fluid accumulator, and including a pump which is connected with its suction side to the pressure fluid accumulator by means of a pressure fluid connection and with its pressure side to a pressure fluid conduit that extends from the braking pressure generator to the wheel brake,
    wherein partial charging of the pressure fluid accumulator is provided, to which end the pressure fluid connection between the pressure fluid accumulator and the suction side of the pump can be closed and, upon attainment of a maximum partial charge, excessive pressure fluid volume can be withdrawn from the pressure fluid accumulator, wherein the pressure fluid accumulator includes two charging pistons in tandem arrangement, one charging piston being acted upon exclusively by partial charge pressure fluid and supplying the pump with pressure fluid in response to a pilot pressure adjusted by a non-return valve in the pressure fluid channel, while the second charging piston is acted upon by a pressure fluid volume which is in excess of the partial charge, the said pressure fluid volume feeding the pump during automatic brake management control operations.

* * * * *